United States Patent [19]

Ferrari

[11] Patent Number: 4,658,127
[45] Date of Patent: Apr. 14, 1987

[54] PATTERN TRACER WITH KERF DEPENDENT CONTROL FOR IMPROVED CORNERING

[75] Inventor: Francis E. Ferrari, LaGrange Park, Ill.

[73] Assignee: Stewart-Warner Corporation, Chicago, Ill.

[21] Appl. No.: 687,015

[22] Filed: Dec. 28, 1984

[51] Int. Cl.$^4$ ............................................. G05B 1/00
[52] U.S. Cl. ..................................... 250/202; 318/577
[58] Field of Search ......................... 250/202; 318/577; 364/520

[56] References Cited

U.S. PATENT DOCUMENTS 4,578,574  3/1986  Grant et al. ......................... 250/202

Primary Examiner—Gene Wan
Attorney, Agent, or Firm—A. G. Douvas

[57] ABSTRACT

An electrically controlled pattern tracer selectively uses stored detected pattern information from a sensor differently depending upon the value of a selected entered kerf entered to control the tracing element to follow a pattern turn. The tracer also distinguishes one type of pattern turn from another and delays use of stored pattern information for control of the tracing element by different amounts depending upon the type of turn detected and the entered kerf.

18 Claims, 10 Drawing Figures

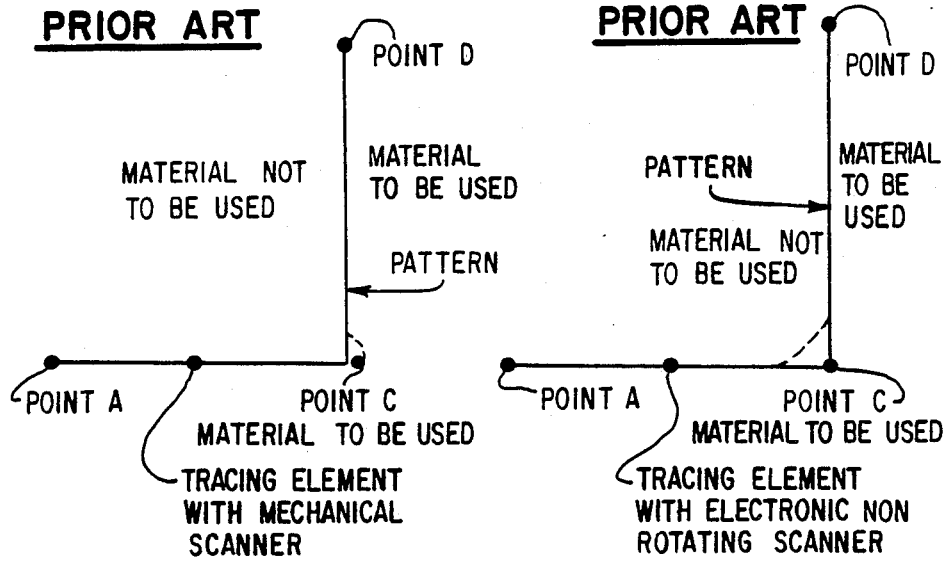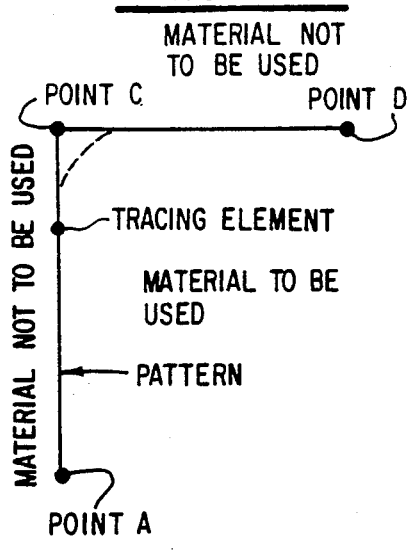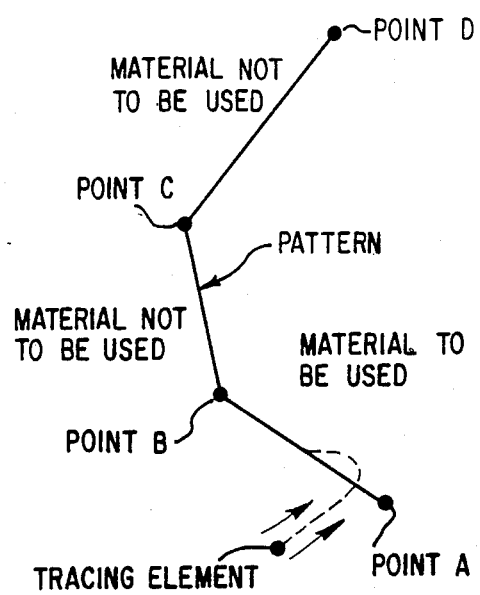

PATTERN TRACER WITH KERF DEPENDENT CONTROL FOR IMPROVED CORNERING

BACKGROUND OF THE INVENTION

This invention relates to electrically controlled pattern tracers of the type which have means for selectively varying the lateral offset of a tracing element with respect to a pattern for different kerfs associated with different cutting tools, such as disclosed in patent application Ser. No. 428,577 of Grant et al. filed Sept. 30, 1982, and entitled "Pattern Tracer With Variable Effective Forward Offset and Method", assigned to the assignee of the present application and, more particularly, to such an apparatus with means improving the tracing of a pattern turn by controlling the movement of the tracing element differently depending upon the the kerf.

Sharp, or small radius, turns in a pattern can be more closely followed by adjusting the forward offset and tracing speed for a given kerf. However, the lateral offset of the scanning mechanism for a given kerf produces deviation from the pattern when cutting out a corner with a small radius. This deviation increases as the kerf or lateral offset of the tracing element is increased.

In cutting inside corners on a pattern, two different type of errors occur depending on the kind of scanning mechanism used. First, mechanical scanners that are laterally displaced from the center of the tracing mechanism can permit the tracer to move too far into the corner before detecting the corner. This excessive movement of the tracer into the corner causes a gouge to be taken out of the material being cut. An example of such a gouge is shown by the dotted line in FIG. 1, where the tracer element has traveled along the pattern line, from point A to a pattern turn at point C and has departed from the pattern en route to another point D. For purposes of simplification, the location of the tracing element is shown on the pattern line in FIG. 1 and other figures but it should be appreciated that, in actual practice, it follows the line along a path which is laterally offset from the line by an amount determined by pattern line thickness and kerf. Secondly, electronic, nonrotating scanners will detect the corner too early which will cause the corner to be rounded off, as illustrated by the dotted line in FIG. 2.

In cutting outside corners, regardless of whether a mechanical scanner, or electronic nonrotating, scanner is used, the corner is detected too early. As a result, the tracer turns the corner too early and causes the corner to be cut off or rounded, as illustrated by the dotted line in FIG. 3.

Another similar problem arises when the tracing element is "catching" a pattern by approaching it from an off pattern position and then first detecting, or "catching", the pattern, and thereafter, beginning to trace the pattern. Regardless of the type of scanning mechanism, the tracer will move too far into the pattern before tracing the pattern and thereby gouge the material to be cut before the proper kerf is implemented. This is shown in FIG. 4. The pattern tracer approaches the pattern line determined by points A, B, C and D, and then the tracer detects the pattern too late before the momentum of the tracer can be shifted to place the tracer onto the pattern and implement the kerf. As a result, a gouge will occur in the material as shown by the dotted line.

Because of these cornering problems, tracer patterns are usually designed to have the minimum radius of all pattern corners to be not less than twice the maximum kerf to be used on the pattern. As a result, patterns with zero radius or small radii turns cannot easily be accurately cut with present tracers, particularly if kerf is also provided.

Some of these problems have been alleviated by the pattern tracer disclosed in the aforementioned U.S. patent application of Grant et al., U.S. Ser. No. 478,577. In the pattern tracer discussed in this application, a large forward offset is used and the information received about the advancing pattern is stored in a computer memory. When a corner is detected, the stored information is used after a time delay which is a function of the velocity of the tracer. The amount of delay is stored in another part of the computer memory called a scan delay table. The scan delay numbers in this table are based on the forward offset and velocity of the tracer and are used to substantially maintain the tracer on the pattern when turning a corner. However, this table of numbers was not dependent upon the lateral offset required for kerf and minor tracing errors therefore still exist.

SUMMARY OF THE INVENTION

Accordingly, it is a principal object of the present invention to provide a pattern tracer like the one disclosed in the aforementioned U.S. patent application of Grant et al., but with improved tracing capability by controlling the movement of the tracing element differently depending upon an entered kerf selected for the pattern.

More specifically, it is an objective to achieve this primary object through provision of an apparatus for tracing a pattern with a tracing element comprising a sensor for detecting a pattern, means for selecting an entered kerf and means for using the detected pattern information from the sensor differently depending upon the value of the entered kerf to control the tracing element to follow the pattern.

It is a further objective to provide an apparatus for tracing a pattern with a tracing element, comprising a sensor for detecting the pattern, means responsive to the pattern as sensed for distinguishing one type of pattern turn from another, means for selecting an entered kerf, and means for controlling the movement of the tracer in accordance with the entered kerf and the type of pattern turn detected.

Yet another objective is to provide an apparatus for tracing a pattern with a tracing element comprising a sensor for detecting the pattern, means for storing the pattern detection information from the sensor, means for selecting an entered kerf, means for selecting the stored pattern information in accordance with the entered kerf and means for controlling the movement of the tracing element in accordance with the selected stored information.

In a preferred embodiment, the pattern tracer is provided with a relatively large effective forward offset and the information from a pattern sensor is stored in memory. When a corner is detected, the stored information is used with a delay which is a function of velocity and the delay is stored in a table which is called a scan delay table. In keeping with the present invention, it has been found that if the numbers stored in this scan delay table are modified in accordance with the amount of kerf entered into the system, the tracing of corners can be improved. When an inside angle is detected, the amount of delay is proportional to one formula relating the entered kerf to a preselected maximum kerf in which the delay is an inverse function of the kerf. When tracing outside corners, two different formulas are used depending upon whether the ratio of the entered kerf to the maximum kerf is greater or lesser than 50%. Also, with respect to the tracing of outside corners, a test is first conducted on the corner to determine angle size and the delay is only altered in accordance with the formulas if the angle is less than the preselected angle such as 45°.

BRIEF DESCRIPTION OF THE DRAWINGS

The foregoing objects, features and advantages will be described in greater detail and further objects, features and advantages will be made apparent from a reading of the following detailed description of the preferred embodiment which is given with reference to the several views of the drawings, in which:

FIG. 1 is a view of a pattern illustrating gouging of an inside corner by a mechanical scanner resulting from not implementing a kerf adjustment referred to in the foregoing background;

FIG. 2 illustrates the rounding of an inside corner of a pattern caused by an electronic nonrotating scanner with no kerf dependent adjustment;

FIG. 3 illustrates the rounding of an outside corner of a pattern caused by use of a scanner with a fixed forward offset;

FIG. 4 is a view of a typical pattern where the tracing element is approaching, or "catching", the pattern to trace it:

DETAILED DESCRIPTION

Figure 5:
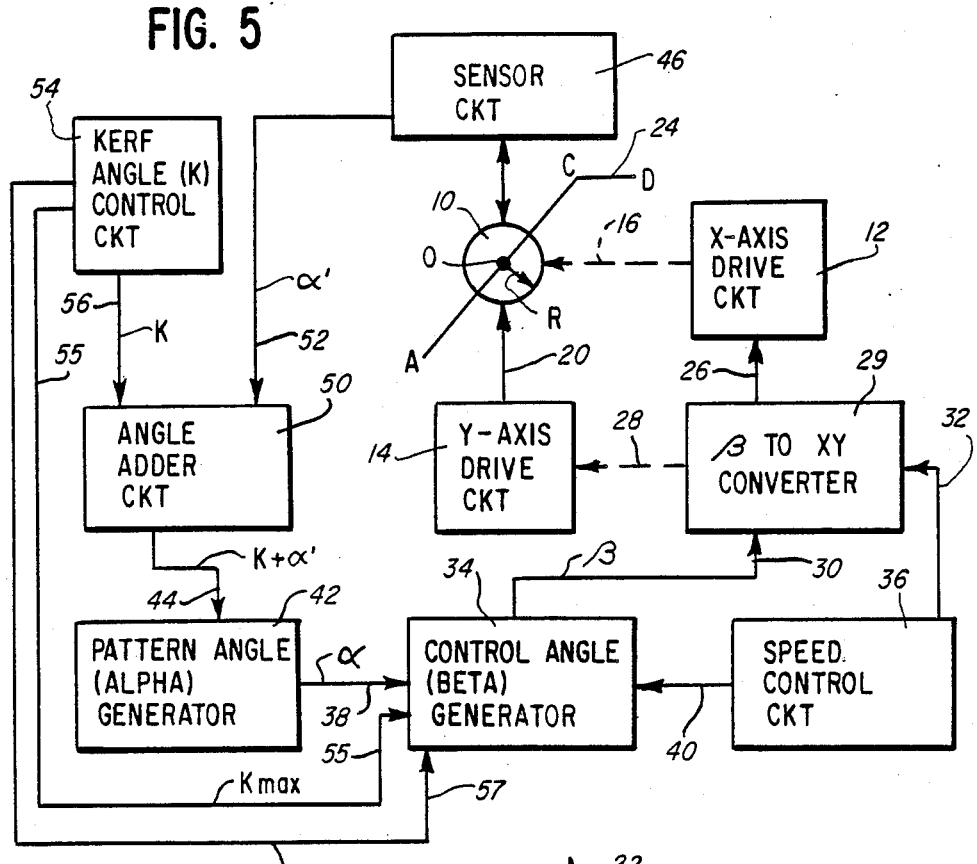
FIG. 5 is a functional block diagram of the pattern tracer of the present invention.
Figure 6:
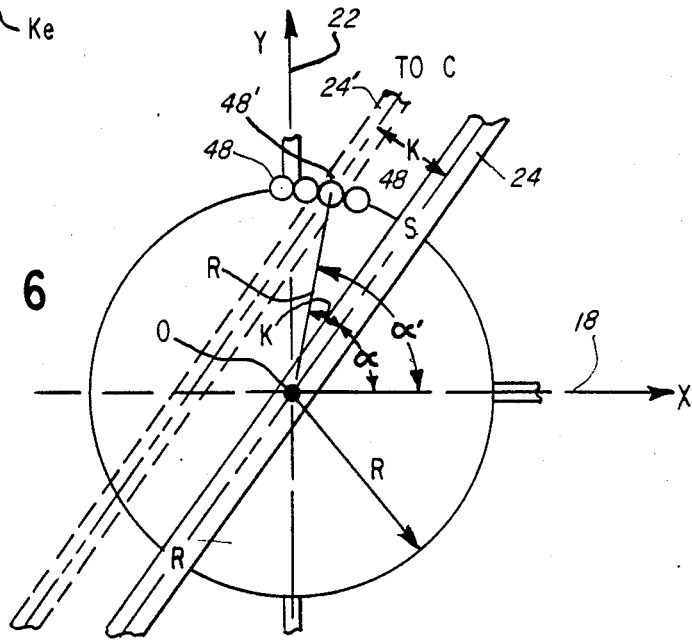
FIG. 6 is a schematic illustration of a circular sensor employed in the present invention and illustrating its relationship with a pattern line and the manner in which the lateral offset of the tracing element is defined.

Referring now to the drawings, particularly FIG. 5, a preferred embodiment of the pattern tracer of the present invention is seen to have a circular sensor 10 with an actual forward offset R with respect to a tracing element, or reference point, O. The physical movement of the sensor 10 and tracing element 0 is accomplished by means including an X-axis Drive Circuit 12 and a Y-axis Drive Circuit 14. The X-axis Drive Circuit is coupled to the sensor 10 by a suitable mechanical drive linkage 16 which causes it to move along a sensor X-axis 18, as best seen in FIG. 6. The X-axis 18 passes through the tracing element 0. Likewise, the Y-axis Drive Circuit 14 is coupled through a mechanical linkage 20 to selectively move the sensor 10 along a sensor Y-axis 22 which is perpendicular to X-axis 18, as seen in FIG. 6. Since Y-axis 22 also passes through tracer element 0, an orthogonal coordinate system is defined with its origin at tracing element 0.

B coordinating the drive applied in the X direction with the drive applied in the Y direction, the tracing element 0 is caused to move in any selected direction, such as the direction of a pattern 24. The X-axis Drive Circuit 12 and the Y-axis Drive Circuit 14 respond to control signals applied to their respective inputs 26 and 28. These control signals determine the drive speed of the individual drive circuits and determine both the direction and speed of movement of the sensor 10 and tracing element 0.

The X and Y drive signals applied to the drive circuit inputs 26 and 28 are developed by a Beta to XY Converter 29 from a control angle, or beta angle, signal applied to its input 30, and a speed control signal applied to its input 32. The control angle signal is provided by a Control Angle (Beta) Generator 34. The speed control signal is provided by a Speed Control Circuit 36.

The control angle signal is representative of a desired directional angle of movement for the sensor and the Beta to XY Converter 26 translates this angle into the appropriate X and Y components of movement. The Speed Control Circuit 36, on the other hand, provides a signal representative of a speed between a maximum and minimum speed of the tracer, as selected by an operator.

As will be described in greater detail hereafter, the Control Angle Generator 34 produces the control angle beta, or B, in accordance with pattern angle alpha, or A, produced by Pattern Angle (Alpha) Generator 42. Pattern Angle Generator 42 produces the pattern angle alpha based on pattern angle information in the form of electrical signals applied to its input 44. This pattern angle information at input 44 is obtained from an Angle Adder Circuit 50. Angle Adder Circuit 50, in turn, receives pattern angle information alpha prime, or A', at an input 52 from Sensor Circuit 46 and kerf angle information k at an input 56 from a Kerf Angle (k) Control Circuit 54. These two angles are added and applied to input 44 of Pattern Angle Generator 42 to produce the pattern angle alpha applied to input 38 of the Control Angle Generator 34.

In a preferred embodiment, the Angle Adder Circuit 50 also includes means for altering its output in accordance with calibration and line width compensation signals. For purposes of brevity, the details of such compensation will not be described here, but reference can be made to U.S. patent application Ser. No. 538,494, filed Oct. 3, 1983, of Bardwell, entitled "Pattern Tracer With Electronic Kerf, Calibration and Line Width Compensation and Method" and assigned to the assignee of this application.

In the absence of line width or calibration compensation, the Kerf Angle Control Circuit 54 provides a kerf angle k selected by an operator to establish a selected kerf, or lateral offset K, equal to half of the kerf of the cutting tool being controlled as shown in FIG. 6. For purposes of this invention, a kerf maximum angle, $K_{max}$, is predetermined and used in the Control Angle Generator 34 via input 55. Similarly, for purposes of this invention, the kerf which is entered, Ke, is used in the Control Angle Generator 34 via input 57.

In the absence of any kerf (i.e. $K=0=k$), the tracing element 0 is caused to follow the pattern 24' in a position directly overlying the pattern. However, since the cutting tool being controlled by the movement of the tracing element cuts away a portion of the work piece equal to the kerf, it is necessary to trace the pattern with the tracing element moving parallel to the pattern but spaced from the pattern line by a distance K equal to half the kerf. If this is not done, the dimension of the piece obtained from cutting the pattern will be undersized due to the tool cutting into the pattern on all sides by half the thickness of the tool.

The kerf is naturally defined with a radial coordinate system having a selected angular coordinate, k, and a distance coordinate R, which is equal to the actual forward offset R of the sensor 10. This defines the sensing element, such as sensing element 48 in FIG. 6, that will overlie the pattern during the tracing movement. With the kerf angle equal to some non-zero value, k, the tracing element 0 will trace an apparent pattern line 24 at a distance K from the actual pattern line 24', as shown in FIG. 6.

As explained in the aforementioned U.S. patent application of Grant et al., Ser. No. 428,577, the movement of the sensor 10 and tracing element 0 is determined by a control angle beta which is based on the apparent pattern angle alpha. Referring to FIG. 6, the detected pattern angle alpha prime is seen to comprise the sum of the apparent pattern angle alpha and the kerf angle k. The tracer is designed to follow the pattern with the tracing element 0 overlying the apparent pattern line 24. When the kerf angle is zero the angle alpha equals the angle alpha prime and the apparent pattern line 24 coincides with the actual pattern line 24'.

When the kerf angle takes some non-zero value, then the pattern angles alpha produced by Angle Adder Circuit 50 and thus Pattern Angle Generator 42 are the same angles which would be produced if the kerf angle were zero but the actual pattern 24 were located offset therefrom at the apparent pattern 24', as shown in FIG. 6.

As described in detail in the aforementioned U.S. patent application of Grant et al., Ser. No. 428,577, the effective forward offset of the sensor is changed without changing the actual offset R. In the pattern tracer shown in the Grant et al. application, the effective forward offset and kerf adjustments are independent of one another.

The Sensor Circuit 46 controls the operation of the sensor 10. The Sensor Circuit 46, also receives pattern information from the sensor 10 and converts it to a signal representative of the angle alpha prime of the pattern relative to the XY coordinate system, as detected. In this regard, reference to production or detection of angles herein should be understood as a short hand reference to production or detection of one or more signals representing those angles.

Referring to FIG. 6, the Sensor Circuit 46 produces electrical signals based on the geometry of the sensor 10, i.e. the forward offset R, and the pattern 24', as detected by the sensor 10. In this instance, the segment of the pattern shown is a segment of the pattern of FIGS. 1-3 between points A and C. The sensor is a photometric sensor having a plurality of sensor elements 48, such as sixty-four sensor elements, located around a circular periphery.

This plurality of sensor elements are periodically, successively scanned, as described in the aforementioned U.S. patent application of Grant et al., Ser. No. 428,577. Each time a complete revolution is made around the periphery of the sensor 10, a new angle alpha prime is detected and corresponding signals generated. As explained in that patent application, an important aspect of the invention is that the Control Angle Generator 34 functions to generate a control angle beta, or B, which selectively differs from the detected pattern angle alpha prime, to establish an effective forward offset that optimizes the pattern tracing for different tracer speeds. The determination of the control angle beta is based on the actual pattern angle alpha prime, as detected.

In accordance with the present invention, the Control Angle (Beta) Generator 34 makes adjustments to its output signal based on the severity of the angle to be cut, whether the angle is an inside angle or an outside angle, whether the tracer is "catching" a pattern before the tracing begins and based on whether the entered Kerf Ke exceeds the maximum kerf $k_{max}$ permitted. In a preferred embodiment, these discriminating functions are performed through operation of a computer which has been suitably programmed as described, but these same functions could also be performed by specialized, but well known, circuitry. The Control Angle Generator 34 comprises a computer, or a logic circuit, for determination of the control angle to be generated and applied to input of the Beta to XY Converter 26 and appropriate computer interface circuitry.

Figure 7:
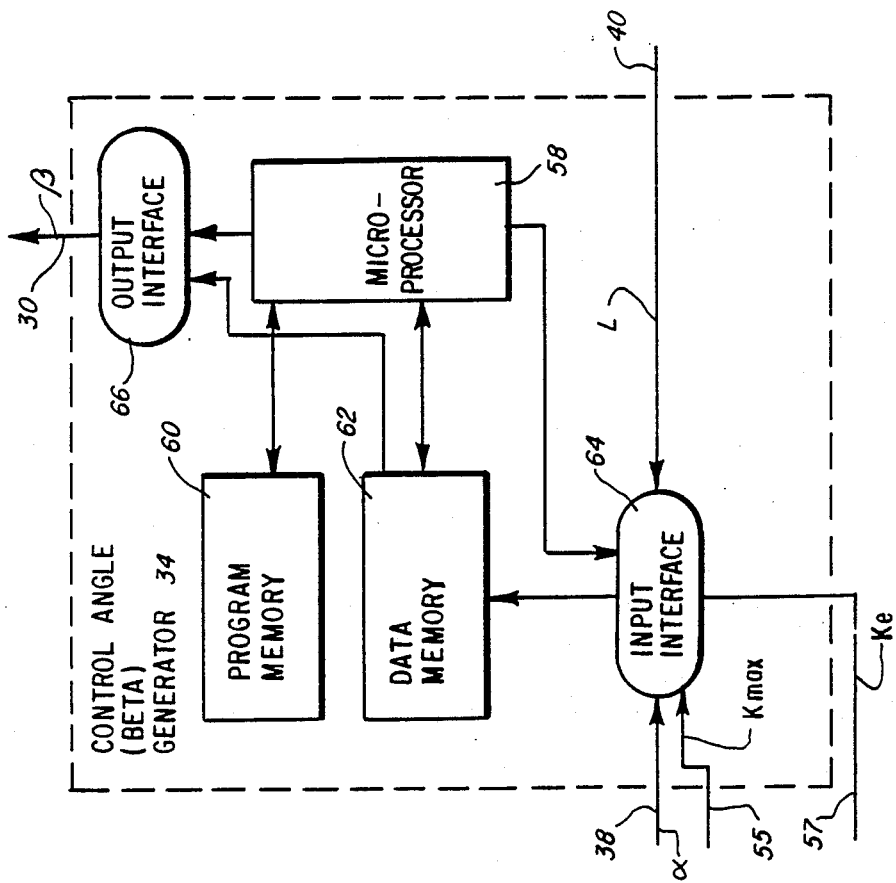
FIG. 7 is a functional block diagram of the Control Angle Generator of FIG. 5.

Referring to FIG. 7, a preferred embodiment of the Control Angle Generator 34 is seen to comprise a Microprocessor 58, a Program Memory 60, such as a ROM and a Data Memory 62, such as a RAM. An Input Interface 64 provides pattern angle information from the Pattern Angle Generator 42 to the Data Memory 62. Input Interface 64 also provides kerf information pertaining to the maximum kerf $K_{max}$ and the entered kerf Ke entered from the Kerf Angle Control Circuit 54 and into Data Memory 62. The Output Interface 66 provides control angle information Beta to the Beta to XY Converter 29. The computer, microprocessor or other logic circuit produces control angles based partly upon the speed and detected pattern angle information applied to its inputs 38 and 40 in accordance with the programs contained in program memory 60, as shown by the algorithms for comparing successive angles and performing a gamma test, by methods disclosed in the aforementioned U.S. patent application of Grant et al. In accordance with the present invention, adjustments to the control angles are also made for sharp turns in the pattern or for catching a pattern, pursuant to the algorithm in FIG. 9.

Specifically, the function of the Control Angle (Beta) Generator 34 is to provide control angle signals to the Beta to XY Converter 29, so that not only does the tracer function as if it had an effective forward offset, but so that it also makes adjustments for the entered kerf Ke and the maximum kerf Km, for turns in the pattern with sharp angles and for catching patterns.

Figure 10:
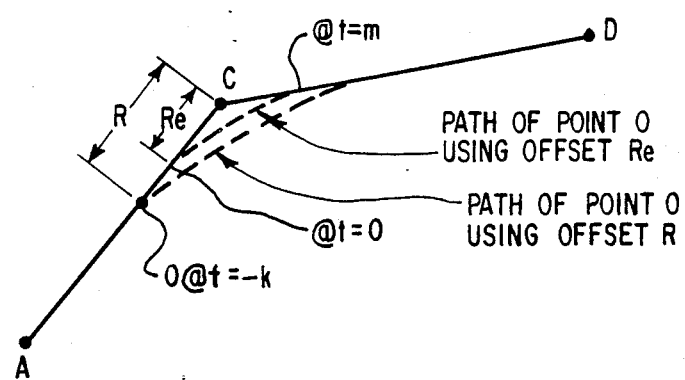
FIG. 10 is schematic illustration of a pattern which illustrates various time periods used to describe operation in accordance with the present invention.

As described in greater detail in the aforementioned U.S. patent application of Grant et al., Ser. No. 428,577, there are three pertinent time references relative to the tracer element following a pattern. Referring to FIG. 10, the first time period is defined as the time before time equal to $-k$ (i.e. $t < -k$). This is the time period before the pattern turn is detected by Sensor 10. During this first time period, the Pattern Angle Generator 42 produces a detected pattern angle Al during each scan, or revolution clock cycle. Thus a series of detected pattern angles $Al_1, Al_2, \ldots Al_n$ are generated with each successive angle $Al_{n+1}$, being equal to the immediately prior angle $Al_n$. Data Memory 62 of the Control Angle Generator 34 temporarily stores angle $Al_n$. The Microprocessor 58 compares the stored angle $Al_n$ to the next generated angle $Al_{n+1}$. So long as the angle $Al_{n+1}$ equals the previously stored detected pattern angle $Al_n$, the Control Angle Generator 34 generates the stored detected pattern angle $Al_{n-7}$ its output 30. In this event, the tracer operates the same as if the output of the pattern angle generator were coupled directly to the input 30 of the Beta to XY Converter 29. During the first time period, the tracer functions as if it had an effective forward offset almost equal to the actual forward offset.

Still referring to FIG. 10, the second time period is defined as the time period between time equal to $-k$ and time equal to zero (i.e. $-k \leq t < 0$). The commencement of this second time period is detected by the control angle generator when its comparitor detects that $Al_{n+1}$ does not equal the previous angle $Al_{n+1-S.D.}$ (i.e. $Al_{n+1} \neq Al_{n+1-S.D.}$). When this occurs, the generator 34, instead of generating a Control Angle Beta which is equal to $Al_{n+1}$, continues to generate control angles beta which are equal to the previously stored detected pattern angle $Al_n$. The Control Angle Generator 34 continues to generate periodic control angles, or a continuous control angle, which is equal to $Al_n$ until time equals zero, i.e. until the tracing element 0 is located a distance from the pattern turn which is equal to the effective forward offset.

Since the tracer moves at a constant speed, the time between $t = -k$ and $t = 0$ is predetermined. The control angle generator 34 includes a counter which commences counting the periodic revolution clock pulses applied to its input or commences counting the pulses of an internal clock at $t = -k$ to determine when $t = 0$, as indicated in FIG. 10. For each preselected speed and effective forward offset, there are a preselected number of pulses after $t = -k$ until time $t = 0$ has been reached. When this preselected number of pulses has been counted, the time $t = 0$ has been reached, and the third time period commences.

The third time period is defined as the time period from $t = 0$ until $t = t_m$, as seen in FIG. 10. Physically, time $t_m$ is defined as the time when the tracer element 0 has passed the pattern turn at C and begins traveling along pattern segment CD. This time is determined when successive detected input angles generated during the third period are equal to each other and both are equal to the pattern angle of the pattern segment CD.

Figure 9:
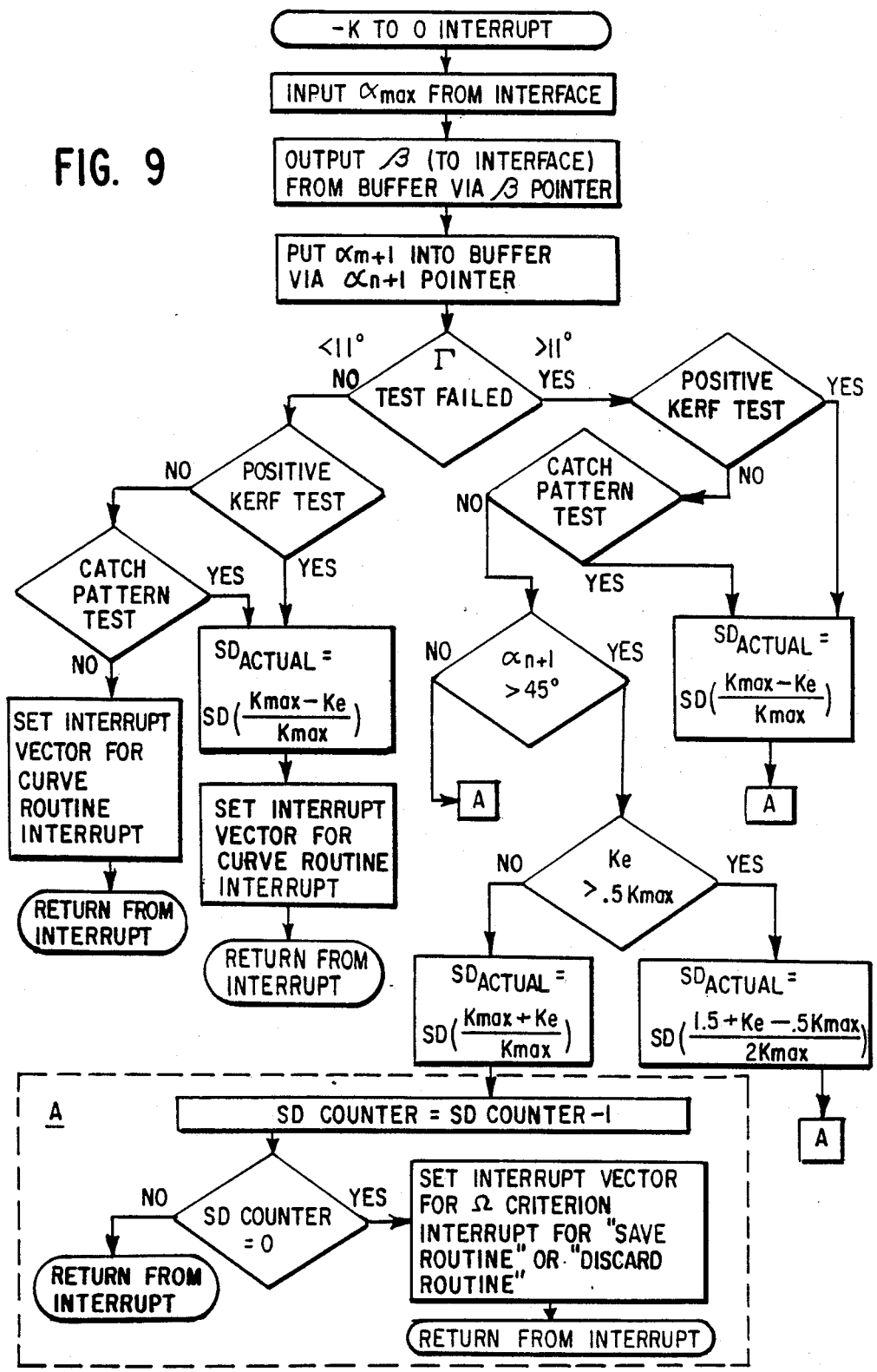
FIG. 9 is an algorithm for operation of the Control Angle Generator of FIGS. 7 and 8 in accordance with the present invention in which the movement of the tracing element is controlled differently and adjusted for the kerf depending on different types of detected pattern turns.

Now referring to the algorithm in FIG. 9, the angles stored in Data Memory 62 from $t = -k$ to $t = 0$ are $Al_{n+1}$. $Al_{n+1}$ is stored in Data Memory 62 via $Al_{n+1}$ Pointer 68. The $Al_{n+1}$ Pointer 68 generates an address for the location at which the next pattern Angle $Al_{n+1}$ is to be stored and, in effect, points at this location.

Figure 8:
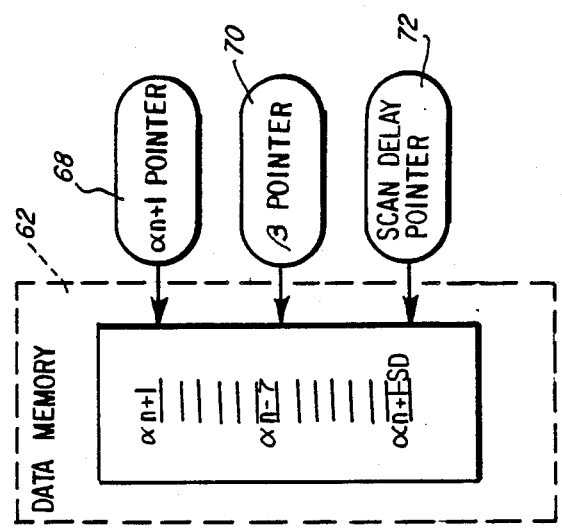
FIG. 8 is a schematic illustration of the data memory and associated address pointers of the Control Angle Generator of FIG. 7.

Another address generator, or control angle beta pointer 70, FIG. 8, points to a selected address of buffer 62 at which a previously provided pattern angle alpha has been stored. When such a storage location is pointed at by the control angle beta pointer 70, the previously stored pattern angle alpha is outputted by buffer 62 to the output interface 66 to provide the control angle Beta. Until $t = 0$, the previously stored pattern angle alpha is outputted by buffer 62 to the output interface 66 to provide the control angle Beta.

Through use of this invention, a closer tracing of the pattern is provided once $t = 0$ is reached. This is accomplished by the algorithm shown in FIG. 9. In FIG. 9 $Al_{n+1}$ is put into buffer via $Al_{n+1}$ Pointer 68, and is then put through the Gamma Test, as disclosed in the aforementioned patent application of Grant et al., Ser. No. 428,577.

If the Gamma Test is not failed, i.e., Alpha angle is less than eleven, the signal is tested to see if a positive kerf exists, i.e., whether the tracing element 0 is on an outside turn of the pattern as seen in FIGS. 1 and 2. If the tracer is on an inside curve the test is passed. The techniques for testing for positive kerf disclosed in the aforementioned U.S. patent application of Bardwell, Ser. No. 538,494, are suitable for this purpose.

If a positive kerf is detected, an adjustment is made to the scan delay regardless of the type of scanner being utilized, i.e., mechanical or electronic. The scan delay determines when $t = 0$, and the tracing element 0 departs from the pattern segment AC to begin moving along segment DC. This scan delay is achieved through operation of a scan delay pointer 72, FIG. 8, and is described further in the aforementioned U.S. patent application of Grant et al., Ser. No. 428,577. This adjustment is made by providing a new, or adjusted, scan delay, or Scan Delay Adjusted, which is proportional to the difference between the maximum kerf $K_{max}$ and entered kerf Ke divided by the maximum kerf $K_{max}$ and the nonadjusted scan delay. That is, Scan Delay Adjusted = (Scan Delay) $\times (K_{max} - Ke)/K_{max}$. This adjusted scan delay is then used in place of the scan delay for the curve routine of the aforementioned U.S. patent application of Grant et al., Ser. No. 428,577. This reduces the gouging, or rounding effect of a mechanical scanner or electronic non-rotating scanner when the pattern makes an inside turn of less than eleven degrees.

On the other hand, if the kerf is determined not to be positive, an outside curve of the pattern is being traced. If a pattern is being caught, such as illustrated in FIG. 4, the tracer is controlled in the manner described above for tracing an inside curve. The scan delay is adjusted as if the tracer were following an inside curve on the pattern.

Now, if the Gamma Test is failed, i.e., the Alpha Angle is greater than eleven degrees, a positive kerf test is made. If the positive kerf test is passed, i.e., the curve is an inside pattern curve, the same scan delay adjustment is made as described above for inside pattern curves under eleven degrees. Once the adjustment is made, the computer proceeds along the "A" Block routine of FIG. 9 which is described in greater detail in the aforementioned U.S. patent application of Grant et al., Ser. No. 428,577.

However, if the positive kerf test is failed, a catch pattern test must be made, as described above, to determine whether the tracing element is catching a pattern or not. If the tracing element is catching a pattern, the same adjustments are made to the scan delay as described above for inside pattern curves.

At this point, the alpha angle must be tested to determine whether the angle is greater than forty-five degrees. If the angle is less than zero degrees, no adjustments are made to the scan delay and the outside curve of the pattern angle is accurately traced. However, if the angle is greater than forty-five degrees, another test is conducted to determine whether the entered kerf Ke is greater than one half the maximum kerf $K_{max}$. If the entered kerf Ke is greater than half the maximum kerf, then the scan delay is adjusted according to the formula Scan Delay Adjusted = Scan Delay $\times (1.25 + Ke/2 - K_{max})$.

On the other hand, if the entered Kerf Ke is less than half the maximum kerf Kmax, the scan delay is adjusted according to the formula by Scan Delay Adjusted = Scan Delay = $(1 + Ke/K_{max})$.

These scan delay adjustments for outside pattern curves of greater than forty-five degrees are made regardless of whether the scanner is mechanical or is an electronic non-rotating scanner.

The preferred embodiment has been disclosed in detail to illustrate the best mode of practicing the invention. Although adjustments are made to the scan delay depending on the sharpness of the curve, whether the curve is an inside or outside pattern curve or whether the tracing element is catching a pattern not not, it should be apreciated that other adjustments can be made on other criteria for other types of curves and that the scope of the invention is defined by the following claims and is not limited to the details of the preferred embodiment.

I claim:

1. An optical tracer assembly for tracing a pattern-line, comprising: an optical sensor for scanning a pattern-line and developing actual pattern-line direction information therefrom, kerf circuit means for preselecting a desired kerf offset and deriving kerf offset information therefrom, means for combining the pattern-line direction information and the kerf offset information to derive tracing direction control information so that the desired kerf offset is effected, a drive circuit for receiving the tracing direction control information and developing drive signals for x and y coordinate servo motors for the optical sensor, and means responsive to changes in the tracing direction control information and the kerf offset information to produce modified tracing direction control information for the drive circuit so that the drive circuit responds faster to changes in pattern-line direction in the presence of at least some preselected kerf offsets.

2. An optical tracer assembly for tracing a pattern-line as defined in claim 1, including means for determining from the kerf offset information whether the sensor is tracing on the inside or outside of a curve, said means to produce modified tracing direction control information being responsive to the means for determining whether the sensor is scanning inside or outside of a curve to effect a faster response of the drive circuit to inside curve tracing than to outside curve tracing.

3. An optical tracer assembly for tracing a pattern-line as defined in claim 1, wherein the means for producing modified tracing direction control information delays the application of tracing direction control information to the drive circuit to reduce an inherent actual forward offset in the optical sensor to an effective forward offset, said delay being reduced in response to increasing kerf offset information.

4. An optical tracer assembly for tracing a pattern-line as defined in claim 3, wherein said means for producing modified tracing direction control information provides a delay reduced in accordance with a first predetermined formula in response to the sensor tracing an outside curve, and provides a delay reduced in accordance with a second predetermined formula in response to the sensor tracing an inside curve so that the drive circuit responds faster to inside curve tracing than to outside curve tracing.

5. An optical tracer assembly for tracing a pattern-line as defined in claim 1, wherein the means providing modified tracing direction control information includes a data memory for storing the tracing direction control information for a delay time and thereafter applying the stored information to the drive circuit to reduce an actual forward offset of the sensor.

6. An optical tracer assembly for tracing a pattern-line as defined in claim 1, wherein said sensor has an actual forward offset, said means for producing modified tracing direction control information being constructed to electronically reduce the actual forward offset to an effective forward offset.

7. An optical tracer assembly for tracing a pattern-line as defined in claim 4, wherein the inside curve formula is:

$$SD_{actual} = SD \times (K\max - Ke/K\max)$$

where
 $SD_{actual}$ = modified delay in transferring the tracing direction control information,
 SD = maximum delay,
 Kmax = maximum kerf,
 Ke = preselected kerf.

8. An optical tracer assembly for tracing a pattern-line as defined in claim 1, wherein the means for producing modified tracing direction control information includes means for determining whether the angle of a curve exceeds approximately 45° and if it does increasing the response of the drive circuit to the modified tracing direction control information.

9. An optical tracer assembly for scanning a pattern-line, comrpising; an optical scanner having a sensor with a fixed forward offset from a reference in the scanner, said sensor in response to detection of the pattern-line developing angular pattern-line direction information, a kerf control for preselecting a desired kerf equal to or less than a maximum kerf and providing preselected kerf angle information, an angle adder circuit for combining the angular pattern-line direction information and the kerf angle information and providing proportional thereto pattern angle information, and a control angle generator for delaying the pattern angle information and then applying it to a drive circuit for x and y coordinate servo motors for the optical scanner to reduce the forward offset of the sensor to an effective forward offset, said control angle generator being responsive to the preselected kerf angle information apart from the adder circuit for reducing the delay in applying the pattern angle information to the drive circuit.

10. An optical tracer assembly for scanning a pattern-line as defined in claim 9, wherein the control angle generator reduces the delay in applying the pattern angle information to the drive circuit proportionally with increases in kerf angle information.

11. An optical tracer assembly for scanning a pattern-line as defined in claim 9, wherein the control angle generator reduces the delay in accordance with the formula:

$$SD_{actual} = SD \times (K\max - Ke/K\max)$$

where;
 $SD_{actual}$ = modified delay in tracing direction control information,
 SD = maximum delay,
 Kmax = maximum kerf, $K_e$ = preselected kerf,
for at least one type of curve tracing.

12. An optical tracer assembly for scanning a pattern-line as defined in claim 11, wherein the control angle generator utilizes said formula only for tracing inside curves, said control angle generator effective no reduction in the delay for tracing outside curves when the curve is less than about 45°.

13. An optical tracer assembly for tracing a pattern-line, comprising: an optical sensor for scanning a pattern-line and developing actual pattern-line direction information, kerf circuit means for preselecting a desired kerf offset and deriving kerf offset information therefrom, means for combining the pattern-line direction information and the kerf offset information to derive tracing direction control information that produces the desired kerf offset, drive circuit means for utilizing the tracing direction control information and developing drive signals for x and y coordinate drive motors for the optical sensor, means for determining whether the sensor is scanning an outside curve or an inside curve, and means responsive to the kerf offset information and the curve determining means for causing the drive circuit means to respond more rapidly to tracing direction control information on inside curves than outside curves.

14. An optical tracer assembly for scanning a pattern-line, comprising; an optical scanner having a sensor with a fixed forward offset from a reference in the scanner, said sensor in response to detection of the pattern-line developing angular pattern-line direction information, a kerf control for preselecting a desired kerf equal to or less than a maximum kerf and developing therefrom kerf angle information, an angle adder circuit for combining the angular pattern-line direction information and the kerf angle information and producing proportional pattern angle information, and a control angle generator for delaying the pattern angle information and then applying it to a drive circuit for x and y coordinate motors for the optical scanner to reduce the forward offset to an effective forward offset, said control angle generator including means for storing the pattern angle information and delaying for a scan delay time the application of the pattern angle information to the drive circuit, said control angle generator determining whether the scanner is tracing an inside curve or an outside curve, said control angle generator being responsive to increasing curve angle information and a detection of inside curve tracing for reducing the scan delay time to reduce the effective forward offset of the sensor, and being responsive to increasing kerf angle information and the detection of outside curves less than a predetermined angle for making no reduction in the scan delay time.

15. An optical tracer assembly for tracing a pattern-line as defined in claim 14, wherein the amount of reduction in scan delay time is a direct function of the kerf angle information.

16. An optical tracer assembly for tracing a pattern-line as defined in claim 14, wherein the amount of reduction in the scan delay time is to 1 minus the ratio of the preselected kerf offset to maximum kerf offset for inside curve tracing.

17. An optical tracer assembly for tracing a pattern-line as defined in claim 14, in which the reduction in scan delay time is proportional to 1 plus the ratio of the preselected kerf offset to a maximum kerf offset for outside curve tracing.

18. An optical tracer assembly for tracing a pattern-line as defined in claim 14, wherein the control angle generator is responsive to the kerf control apart from the angle adder circuit and is also responsive to tracing speed.

* * * * *